United States Patent Office 3,151,462  
Patented Oct. 6, 1964

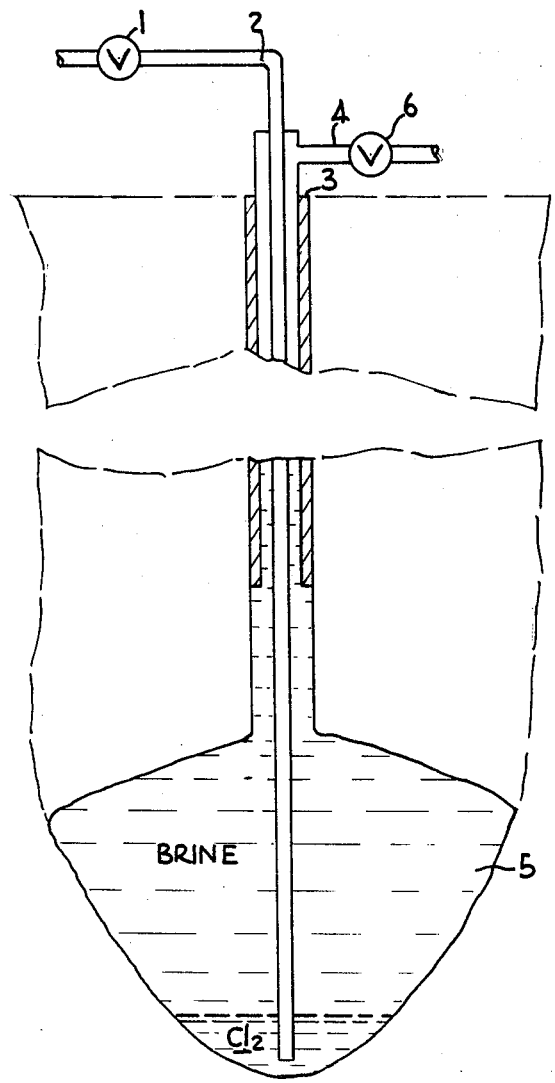

3,151,462  
METHOD OF STORING LIQUID CHLORINE  
Carl W. Raetzsch, Corpus Christi, Tex., assignor, by mesne assignments, to Pittsburgh Plate Glass Company  
Filed Mar. 30, 1960, Ser. No. 18,684  
2 Claims. (Cl. 61—.5)

The present invention relates to the storage of liquid chlorine. More particularly, the present invention concerns an improved process for the safe storage of large quantities of liquid chlorine.

The storage of large quantities of liquid chlorine is a particularly bothersome problem in industry today. Quite frequently chlorine manufacturers are faced with the problem of storing large tonnages of this material due to seasonal declines in chlorine sales and other similar considerations. Heretofore, liquid chlorine has been stored for the most part in large storage tanks operated at superatmospheric pressure. Tanks of this nature generally on the average store from 100 to 150 tons of liquid chlorine and represent an extremely expensive investment due to the heavy reniforcing of the tanks required and the pressure equipment necessary to maintain the liquid chlorine stored in tanks in a liquid state under superatmospheric pressures. The cost of storing liquid chlorine under these conditions is a serious deterrent to the storage of large tonnages of chlorine. In addition, storage tanks of this type require the utilization of considerable physical area at the site of the plant thereby rendering valuable property useless for production facilities.

According to the instant invention, many of the problems formerly faced by the prior art with respect to the storage of large quantities of liquid chlorine are successfully eliminated. Thus, extremely large tonnages of liquid chlorine may be safely stored with a minimum amount of capital investment in pressure equipment and storage vessels. In addition, very little ground area is required for the small quantity of equipment necessary to safely store large quantities of liquid chlorine.

It has been found, according to this invention, that liquid chlorine may be stored safely and economically underground in brine containing cavities which are located at depths below the surface of the ground sufficient to maintain liquid chlorine introduced into these cavities in the liquid state. According to this invention, liquid chlorine is introduced into a brine cavity located at a depth below the surface of the ground sufficient to maintain the liquid chlorine introduced into the cavity in a liquid state. Conveniently as the liquid chlorine is introduced into the cavity, brine is withdrawn therefrom on a volume basis equivalent to the volume of chlorine introduced into the cavity. The brine contained in the cavity in which the liquid chlorine is introduced serves as a blanket for the liquid chlorine introduced and due to the differences in the specific gravity of the liquid chlorine and the saturated brine the liquid chlorine remains at the bottom of the cavity and is successfully prevented from escaping the cavity. Upon introduction of the desired quantity of liquid chlorine to the brine containing cavity, the cavity is conveniently sealed from the surface of the ground by closing the chlorine inlet to the cavity and the brine outlet. As an alternate means of sealing the chlorine inlet tubing, the chlorine tubing can conveniently be filled with brine following the introduction of the chlorine. This filling of the tubing with brine will effectively seal off the chlorine contained in the cavity without dependence on valves. The chlorine in the cavity would be effectively isolated and failure of any or all equipment would not result in the release of chlorine to the atmosphere.

By utilizing existing brine containing cavities which are normally located adjacent or in close proximity to a chlorine production area, hundreds of thousands of tons of liquid chlorine may be safely stored with a minimum of investment. Thus, liquid chlorine may be taken from a chlorine producing plant area, liquefied and introduced into the brine cavity through a casing under sufficient pressure to maintain the chlorine liquid until it reaches a depth of at least 300 feet. Upon attaining this depth, the pressure of the liquid chlorine from this point to the surface of the ground will be sufficient to maintain the liquid chlorine at the 300 foot level and below in the liquid state. The weight of liquid chlorine in the column further will be sufficient to drive the liquid chlorine down the casing to the bottom of the cavity. Brine cavities generally are located at depths in excess of 3,000 to 4,000 feet below ground surface but cavities closer to ground surface can be employed so long as they are at least 400 feet below the surface.

Once introduced into the cavity, the brine in the cavity and in the casing surrounding the chlorine introduction tube will be sufficient to maintain the chlorine introduced in the liquid state. As chlorine is introduced in the cavity, brine will be forced up through the column surrounding the chlorine introduction means or casing and removed from the cavity through an outer casing surrounding the chlorine conduit leading into the brine cavity. This column of brine should be at least 300 feet in depth to provide a brine blanket over the chlorine of at least 300 feet. Usually the column of brine is much higher and a brine column of 1,000 feet or more is maintained above the liquid chlorine stored.

Liquid chlorine has a specific gravity of approximately 1.28 while saturated brine under similar conditions has specific gravity of 1.185. The differences in specific gravity therefore are such that the brine serves very effectively as a cover for the liquid chlorine which due to this difference will remain in the bottom of the brine cavity. While liquid chlorine is somewhat soluble in brine under the pressure conditions which exist at depths of 400 to 500 feet and below, this increased solubility of liquid chlorine in saturated brine decreases as the liquid chlorine is brought closer to ground surface. Thus, in removing liquid chlorine from a brine cavity as it ascends the column from the cavity to the surface of the ground, and reaches depths of 400 to 500 feet or less the increased liquid chlorine content in the brine will be decreased as droplets of liquid chlorine leave the brine and return to the bottom of the cavity.

Due to the slight solubility of liquid chlorine in brine, the outer casing of the well is conveniently constructed of corrosion resistant material, that is, material corrosion resistant to wet chlorine. Similarly, in withdrawing liquid chlorine from the brine cavity, the chlorine will be saturated with water and a drying plant is preferably placed at the site of the well if the chlorine is to be transported in steel lines or tanks. If desired, a corrosion resistant means of transporting the chlorine back to the chlorine plant may be utilized.

In conducting the operation of storing large quantities of liquid chlorine in an existing brine cavity, use may be made of the cavity and the well equipment already present at the well site. Thus, normally in solution mining of brine from a brine well located at a substantial depth below the surface of the ground a casing is provided for a substantial distance below the surface of the ground and an inner tubular casing is inserted within this outer casing. Water is introduced into the brine cavity through this inner casing. This water is introduced into the brine cavity through the inner casing and brine is removed from the cavity by overcoming the differential pressure between the water being introduced into the inner casing and the outer casing which is exposed to the atmosphere of the surface of the ground. In this manner as water is introduced through the inner casing, brine is removed from the well through the outer casing.

Utilizing this equipment, it is relatively simple matter to store liquid chlorine in an exhausted or depleted brine cavity by introducing the liquid chlorine into the brine cavity through the inner casing. As the chlorine traverses the 300 foot depth, the weight of the column of chlorine from the surface of the ground to this depth will be sufficient to push or force the remaining chlorine introduced down into the bottom of the cavity and maintain it in a liquid condition during transit. If the cavity is completely filled with brine as the chlorine is introduced, a corresponding quantity of brine is removed from the outer casing at the surface of the ground.

The outer casing may be adequately protected by inserting a casing resistant to wet chlorine to a depth below the surface of the normal well casing. As an alternative means of getting the chlorinated saturated brine to the surface without replacing the steel outer casing normally found in such a well, a second corrosion resistant tube could be installed to a point below the steel casing for the upcoming brine. Alkaline brine could then be pumped slowly into the top of the steel casing to form a stagnant column of alkaline brine down through the length of the steel casing.

Removing chlorine from the cavity once it is stored is a relatively simple operation and the liquid chlorine is delivered as a liquid at any desired pressure by pumping saturated brine into the outer casing at the desired chlorine pressure by taking into account the differential pressure caused by the difference in density of the chlorine and the blanketing saturated brine. The chlorine as it reaches the surface of the ground may then be transported in equipment suitably corrosion resistant to wet chlorine back to the chlorine plant for drying or, if desired, a drying plant may be constructed at the side of the well for the purpose of drying the chlorine as it is removed from the cavity. The product in the latter case may then be transported in steel lines or tanks to the customer or shipping point.

For more complete understanding of the invention, reference is made to the drawing in which is shown a brine cavity generally indicated at 5. Located within the cavity is a tube 2 utilized for the introduction of the liquid chlorine into the brine cavity. At one end of the tube 2 is located a valve 1 which, when closed, effectively seals the liquid chlorine introduced through the column 2 from the atmosphere. Surrounding the column 2 is a well casing 3 usually constructed of steel or some other structural material but preferably constructed of a material resistant to wet chlorine. Immediately adjacent the well casing 3 is a tubular member 4 utilized for the removal of brine from the depths of the cavity 5. A valve 6 located on the tube 4, when closed, effectively seals the brine removal tube 4 from the atmosphere.

In a filling operation, valve 1 is open and liquid chlorine is introduced through tubular member 2 into the cavity 5. Brine is removed from the cavity through tube 4 and valve 6, in amounts usually corresponding to the quantity of liquid chlorine introduced into the cavity. On completion of the filling of the desired quantity of liquid chlorine, valve 1 is closed and valve 6 is closed and the cavity effectively sealed from the surface of the ground. In removing liquid chlorine from the cavity desired, valve 6 is open and brine is introduced into the cavity at the desired chlorine pressure. This pressure is determined by applying to the brine introduced into the cavity the desired chlorine pressure plus the differential pressure caused by the differences in the density of the chlorine and the brine at the depth of the brine cavity. This pressure is usually somewhere in the neighborhood of 215 pounds per square inch. Liquid chlorine is thereby driven to the surface of the ground at the desired pressure through line 2.

While the invention has been described with reference to certain specific embodiments thereof, it is to be understood that these are merely illustrative and certain modifications may be made without departing from the spirit and scope of the invention except insofar as appears in the accompanying claims.

I claim:

1. A method of storing liquid chlorine comprising introducing liquid chlorine into a brine containing cavity located at a depth below the surface of the ground sufficient to maintain the chlorine in a liquid state, withdrawing from the cavity a quantity of brine on a volume basis equivalent to the liquid chlorine introduced into the cavity while providing a quantity of brine in the cavity sufficient to provide a layer of brine above the liquid chlorine stored at least 300 feet in depth and sealing the cavity upon introduction of the desired quantity of chlorine.

2. A method of storing liquid chlorine comprising introducing chlorine into a brine containing cavity located at a depth below the surface of the ground sufficient to maintain the liquid chlorine introduced in a liquid state, withdrawing from the cavity a quantity of brine on a volume basis equivalent to the chlorine introduced into the cavity, providing a quantity of brine above the surface of the liquid chlorine in the cavity at least 300 feet in depth during the storage period, and removing liquid chlorine from the cavity when desired by introducing brine into the cavity at the pressure sufficient to force liquid chlorine to the surface of the ground.

References Cited in the file of this patent
UNITED STATES PATENTS

| | | |
|---|---|---|
| 2,922,281 | Brooks | Jan. 26, 1960 |
| 2,961,841 | Giles | Nov. 29, 1960 |